United States Patent [19]

Stone et al.

[11] Patent Number: 5,697,738

[45] Date of Patent: Dec. 16, 1997

[54] SPADE-TYPE BORING BIT HAVING CHAMFERED CORNER PORTIONS

[75] Inventors: Paul Andrew Stone, Glen Rock, Pa.; Rickey James Thomas, Lineboro, Md.; Timothy T. McKenzie, Baltimore, Md.; Richard Alan Adams, Timonium, Md.

[73] Assignee: Black & Decker, Inc., Newark, Del.

[21] Appl. No.: 514,071

[22] Filed: Aug. 11, 1995

Related U.S. Application Data

[63] Continuation-in-part of Ser. No. 366,986, Dec. 30, 1994.

[51] Int. Cl.⁶ ................................................. B23B 51/00
[52] U.S. Cl. ........................................... 408/225; 408/228
[58] Field of Search ................................ 408/211, 213, 408/214, 225, 224, 226, 227, 228, 230

[56] References Cited

U.S. PATENT DOCUMENTS

| | | |
|---|---|---|
| 85,107 | 12/1868 | LeCount . |
| D. 240,263 | 6/1976 | Southall . |
| D. 278,065 | 3/1985 | Sydlowski et al. . |
| 606,319 | 6/1898 | Watrous . |
| 1,004,902 | 10/1911 | Potter . |
| 1,483,082 | 2/1924 | Dosimont . |
| 1,595,588 | 8/1926 | Tuttle . |
| 1,738,032 | 12/1929 | Behrman et al. . |
| 2,091,128 | 8/1937 | Anderson . |
| 2,159,842 | 5/1939 | Cook . |
| 2,206,292 | 7/1940 | Rosenberg . |
| 2,310,675 | 2/1943 | Boyce . |
| 2,326,106 | 8/1943 | Van Ness et al. . |
| 2,332,295 | 10/1943 | Bouchal . |
| 2,335,791 | 11/1943 | Rea . |
| 2,403,651 | 7/1946 | Fulke . |
| 2,543,206 | 2/1951 | Smith . |
| 2,627,292 | 2/1953 | Kronwall . |
| 2,645,138 | 7/1953 | Mitchhart . |
| 2,681,673 | 6/1954 | Mackey . |
| 2,692,627 | 10/1954 | Stearns . |
| 2,697,951 | 12/1954 | Muller . |
| 2,748,460 | 6/1956 | Ulrich . |

(List continued on next page.)

FOREIGN PATENT DOCUMENTS

| | | |
|---|---|---|
| 1097104 | 3/1981 | Canada . |
| 0118806 | 9/1984 | European Pat. Off. . |
| 2617753 | 1/1989 | France ................................ 408/213 |
| 2636182 | 2/1978 | Germany . |
| 4207964A1 | 3/1992 | Germany . |
| 56-74343 | 6/1981 | Japan . |
| 63-52730 | 3/1988 | Japan . |
| 547268 | 2/1977 | Russian Federation . |
| 1277117 | 12/1969 | United Kingdom . |
| 2130935 | 6/1984 | United Kingdom . |
| 2271948 | 4/1994 | United Kingdom . |

*Primary Examiner*—Daniel W. Howell
*Attorney, Agent, or Firm*—Bell, Seltzer, Park & Gibson, P.A.

[57] ABSTRACT

The spade-type boring bit includes an elongate shank defining a central longitudinal axis and a blade portion joined to one end of the shank. The blade portion includes a pair of generally flat side segments extending laterally from the central longitudinal axis and having a respective forward cutting edge and a respective chamfered corner portion. Each chamfered corner portion includes a chamfered edge which extends both axially rearward and laterally outward from the respective forward cutting edge so as repeatedly cut the peripheral wall of the resulting hole as the spade bit is rotatably advanced through a workpiece. The spade bit therefore produces a high-quality hole having a smooth peripheral wall and relatively clean entry and exit points. In addition, the forward cutting edges of the spade bit can be aligned with each other along a centerline which passes through the central longitudinal axis of the elongate shaft so as to increase the efficiency with which the spade bit drills. The spade bit also includes a spur joined to and extending axially from the forward end of the blade portion. The spur can include spur cutting edges separated radially, angularly and, in some instances, longitudinally or axially from the forward cutting edge of the adjacent side segment to prevent accumulation of chip swarf between the spur cutting edge and the adjacent forward cutting edge.

73 Claims, 5 Drawing Sheets

U.S. PATENT DOCUMENTS

| | | |
|---|---|---|
| 2,765,760 | 10/1956 | Lyon . |
| 2,782,824 | 2/1957 | Robinson . |
| 2,794,468 | 6/1957 | Huxtable . |
| 2,883,888 | 4/1959 | Stewart . |
| 2,962,066 | 11/1960 | Deliso . |
| 3,292,412 | 12/1966 | Costabile . |
| 3,354,690 | 11/1967 | Beckwell . |
| 3,381,515 | 5/1968 | Orloff . |
| 3,504,575 | 4/1970 | Makino et al. . |
| 3,824,026 | 7/1974 | Gaskins . |
| 3,920,350 | 11/1975 | Southall . |
| 3,997,279 | 12/1976 | Porter . |
| 4,012,970 | 3/1977 | Hintz et al. . |
| 4,050,841 | 9/1977 | Hildebrandt . |
| 4,286,904 | 9/1981 | Porter et al. . |
| 4,620,822 | 11/1986 | Haque et al. . |
| 4,625,593 | 12/1986 | Schmotzer . |
| 4,682,917 | 7/1987 | Williams, III et al. . |
| 4,753,558 | 6/1988 | Jansson . |
| 4,759,667 | 7/1988 | Brown .................................. 408/230 |
| 4,836,006 | 6/1989 | Brown . |
| 4,838,062 | 6/1989 | Prenn . |
| 4,950,111 | 8/1990 | Thomas . |
| 5,056,967 | 10/1991 | Hageman . |
| 5,061,127 | 10/1991 | Thomas . |
| 5,099,933 | 3/1992 | Schimke et al. . |
| 5,145,018 | 9/1992 | Schimke et al. . |
| 5,149,234 | 9/1992 | Durfee, Jr. . |
| 5,184,689 | 2/1993 | Sheirer et al. . |
| 5,193,951 | 3/1993 | Schimke . |
| 5,221,166 | 6/1993 | Bothum . |
| 5,286,143 | 2/1994 | Schimke . |
| 5,291,806 | 3/1994 | Bothum . |
| 5,299,441 | 4/1994 | Shinjo . |
| 5,452,970 | 9/1995 | Sundstrom . |

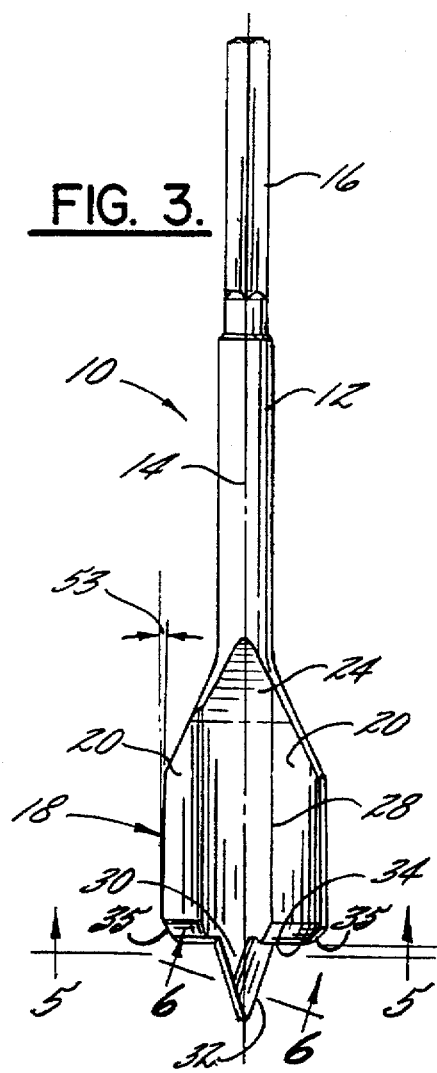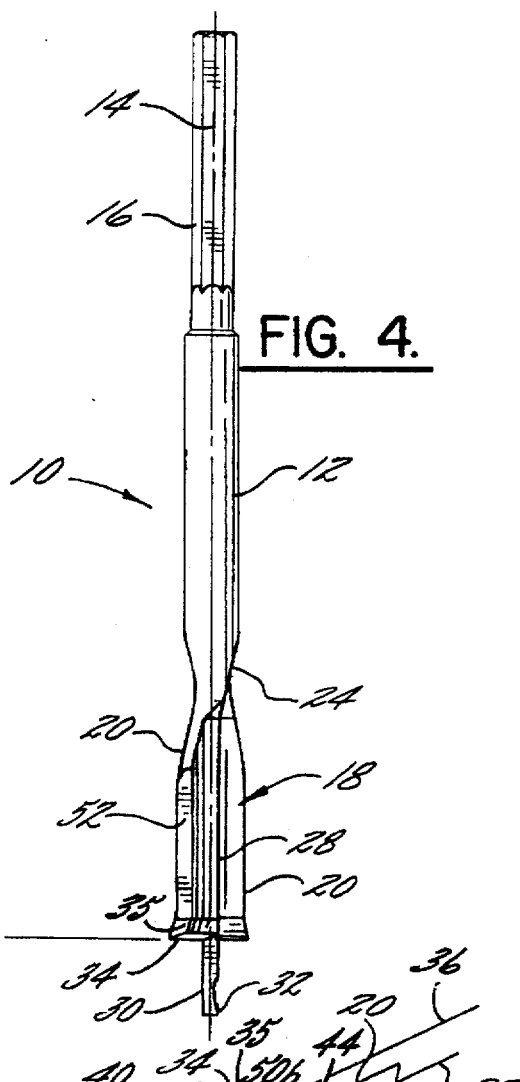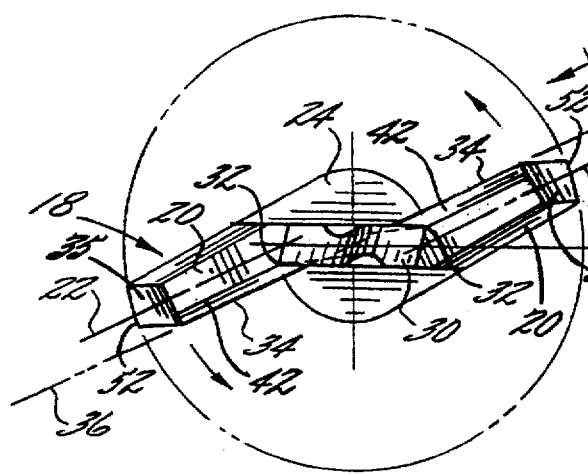

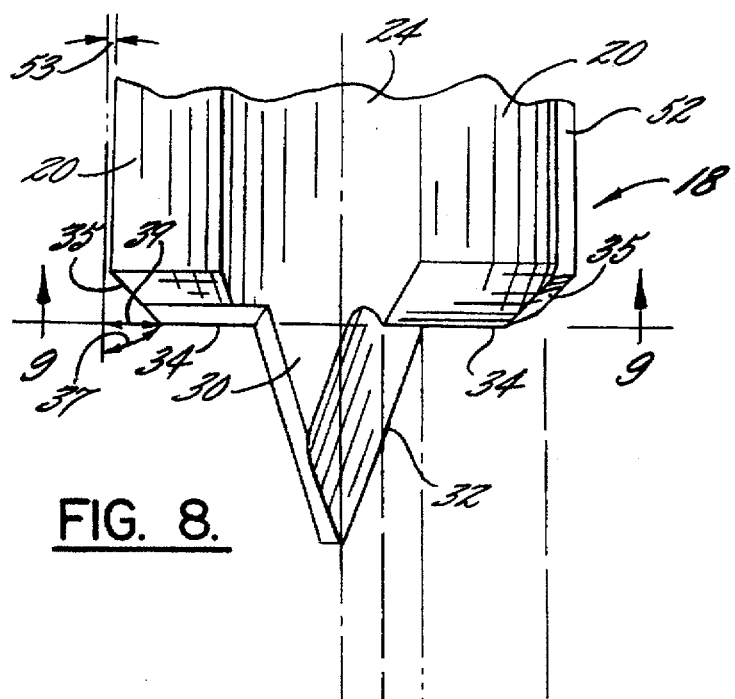
FIG. 8.
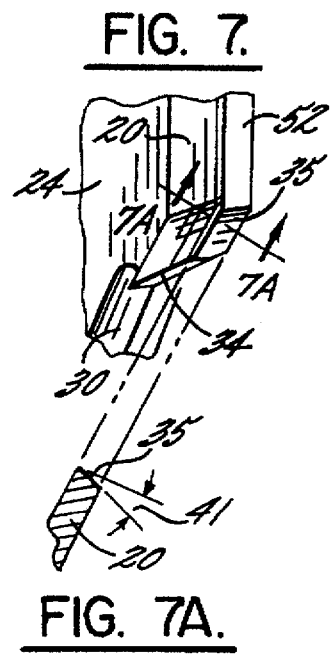
FIG. 7.
FIG. 7A.
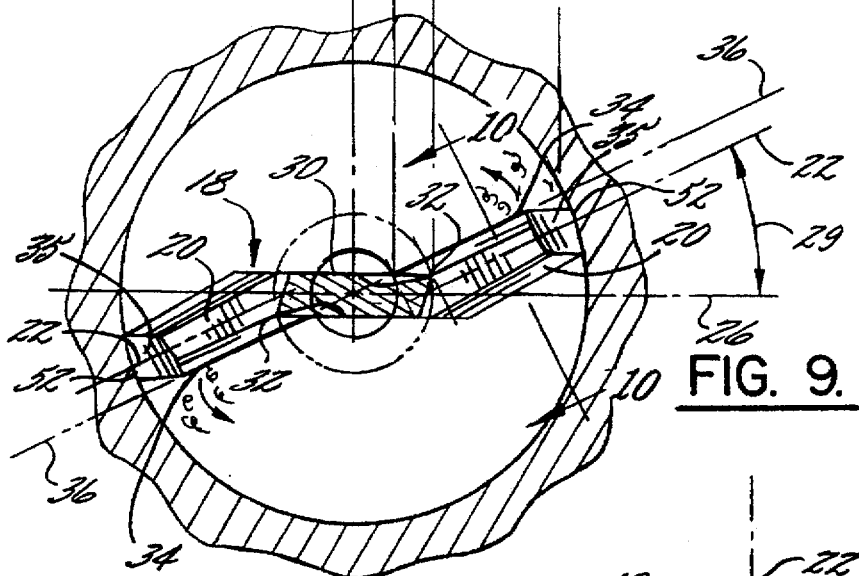
FIG. 9.
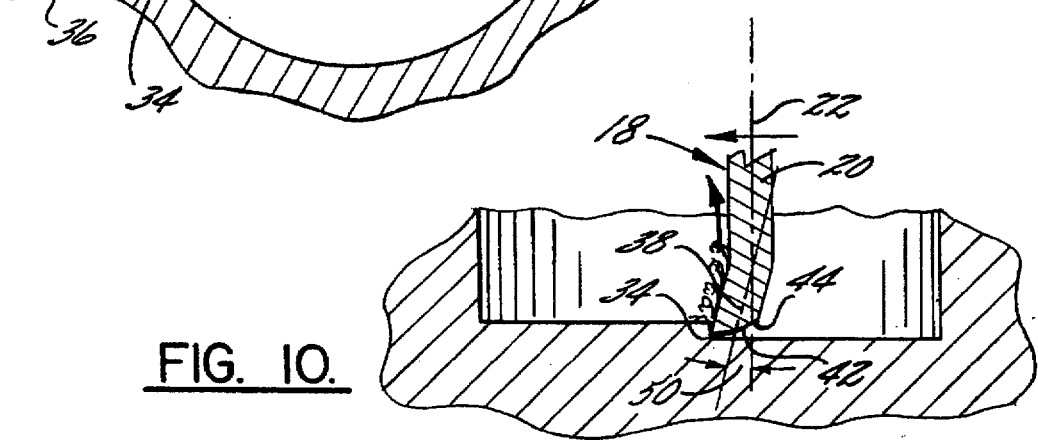
FIG. 10.

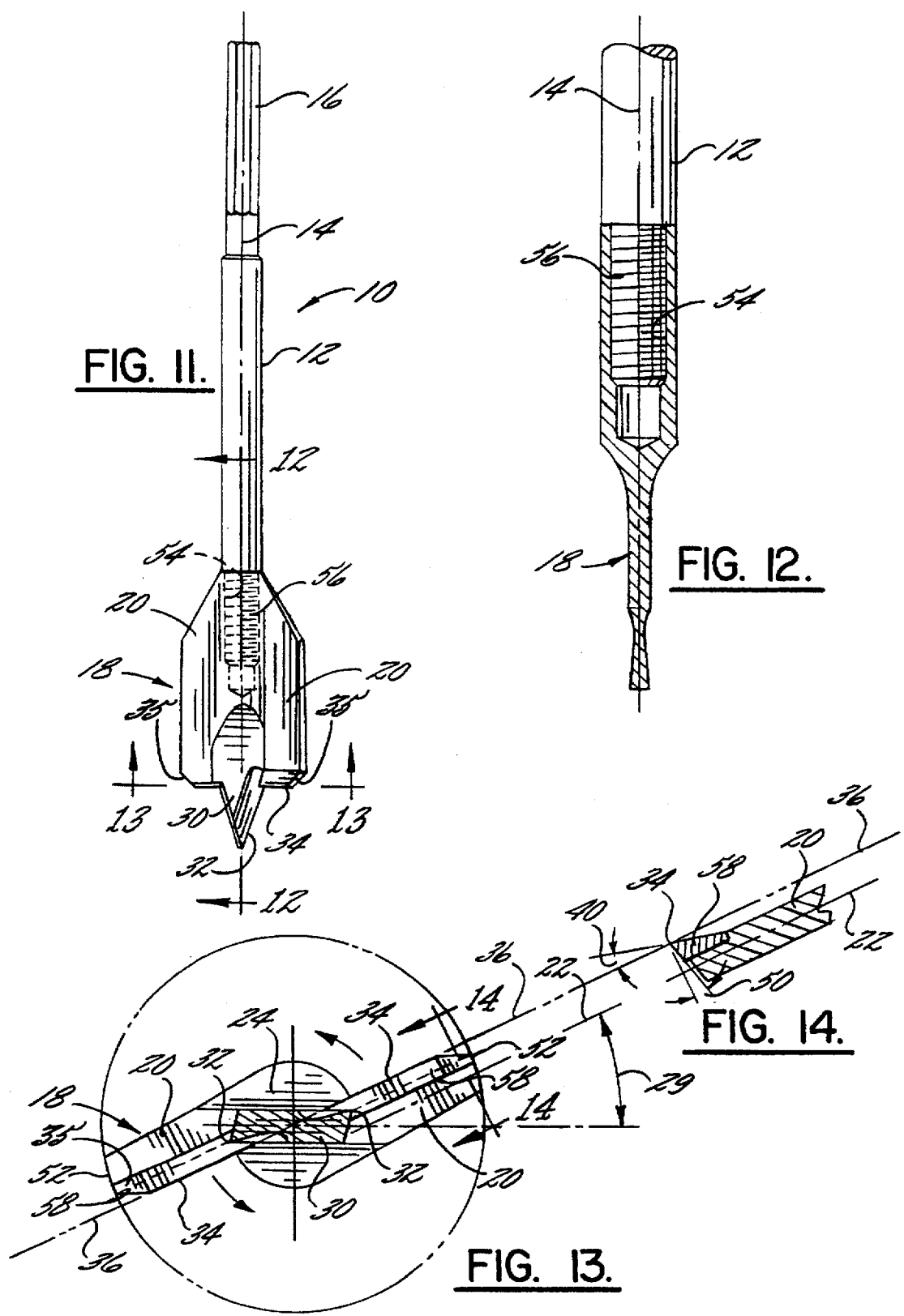

SPADE-TYPE BORING BIT HAVING CHAMFERED CORNER PORTIONS

RELATED APPLICATION

This application is a continuation-in-part of U.S. patent application Ser. No. 08/366,986 filed Dec. 30, 1994, the contents of which are expressly incorporated in their entirety herein.

FIELD OF THE INVENTION

The present invention relates generally to drill bits having chamfered corner portions and, more particularly, to spade-type boring bits having chamfered corner portions for forming high-quality holes.

BACKGROUND OF THE INVENTION

Spade-type boring bits, hereinafter referred to as "spade bits", are commonly employed to drill or bore holes through wood or other materials. A spade bit is typically used to drill holes having a relatively large diameter from which a large amount of wood or other material must be removed. For example, during the construction of a home, spade bits are often utilized to drill a series of aligned holes through adjacent studs through which conduit or wiring will extend.

As illustrated in FIG. 1, a conventional spade bit 1 includes an elongate shank 2 which defines a longitudinal axis 3. A blade portion 4 is joined to a forward end of the shank and the rear end of the shank, opposite the forward end, is received and held by a drill during drilling operations. The blade portion is generally planar and, as shown in FIG. 2, defines a centerline 5 in the plane of the blade portion and extending through the longitudinal axis. The blade portion also includes a pair of side segments 4 extending laterally in opposite directions. See, for example, U.S. Pat. No. 2,782,824 to Robinson issued Feb. 26, 1957; U.S. Pat. No. 4,682,917 to Williams, III, issued Jul. 28, 1987; U.S. Pat. No. 4,950,111 to Thomas issued Aug. 21, 1990; U.S. Pat. No. 5,061,127 to Thomas issued Oct. 29, 1991; U.S. Pat. No. 5,286,143 to Schimke issued Feb. 15, 1994; and British Patent No. GB 2,130,935A published Jun. 13, 1984. A conventional spade bit also generally includes a generally triangular spur 7 joined to and extending axially from a forward end of the blade portion so as to be coplanar therewith. As known to those skilled in the art, the spur serves to guide and center the spade bit during drilling operations.

The spur 7, as well as each side segment 6, generally includes a cutting edge 8 for removing wood or other material when the spade bit 2 is rotated in a predetermined direction of rotation during drilling operations. In particular, the spur cutting edges extend along opposed sides of the base of the spur at the forward end of the blade portion to the forwardmost portion of the spur, i.e., the spur point. In addition, the cutting edge of each side segment is formed on the forward end of the blade portion such that the side segment cutting edge will engage the workpiece when the spade bit is rotated in the predetermined direction of rotation.

In operation, the cutting edges of the spur 7 initially drill a lead hole in the workpiece. Thereafter, the cutting edges of the side segments 6 engage and remove material from the workpiece to drill a hole of a predetermined diameter. Since the spur 7 of a conventional spade bit 2 is typically coplanar with the generally flat side segments as shown in FIG. 2, each cutting edge of the generally triangular spur is contiguous with the cutting edge of the adjacent side segment. Thus, a pair of continuous cutting edges 8 are formed, each including a cutting edge of the triangular spur and the cutting edge of the adjacent side segment. See, for example, U.S. Pat. No. 2,782,624 to Robinson; U.S. Pat. No. 4,682,917 to Williams, III; U.S. Pat. No. 5,221,166 to Bothum issued Jun. 22, 1993; U.S. Pat. No. 5,286,143 to Schimke; and U.S. Pat. No. 5,291,806 to Bothum issued Mar. 8, 1994.

The chip swarf created during the drilling operations is generally directed radially along the cutting surface and toward the outer periphery of the hole being formed, due to the orientation of the cutting edges and the rotation of the spade bit. However, chip swarf is not as readily removed in the vicinity of the corner formed by the intersection of a spur cutting edge and the cutting edge of an adjacent side segment. Instead, chips accumulate in the corner formed by the spur and adjacent side segment cutting edges since the chips are not directed away from the corner by the intersecting cutting edges. Due to the accumulation of chip swarf, the cutting edge in the vicinity of the corner defined by the spur and the adjacent side segment cutting edges does not readily cut into the workpiece and remove material therefrom. Instead, additional power or torque must be applied to rotate the spade bit and to drill a hole through the workpiece once chip swarf has collected in the corner between the spur and adjacent side segment cutting edges.

A further problem caused by the radially outward movement of the chip swarf along the surfaces of the side segment cutting edges is that the chip swarf is forced into the peripheral wall of the hole being formed, and thus binds between the peripheral wall and the outer edge of the rotating blade portion. This binding further increases the power consumption of the drill.

The primary cause of these problems, as shown in FIG. 2, is that the cutting edges 8 of each side segment 6 are not aligned with the centerline 5 that passes through the longitudinal axis 3. Instead, each cutting edge is positioned in advance of the centerline in the predetermined direction of rotation of the spade bit 1. Since the cutting edges are positioned in advance of the centerline, the chip swarf is not directed solely circumferentially away from the cutting edges. Instead, the rotation of the spade bit also imparts a radial force component to the chip swarf which urges the chip swarf against the peripheral wall.

During drilling operations, conventional spade bits can also splinter the workpiece in which the hole is drilled. In particular, conventional spade bits can splinter the workpiece at both the entry and exit points and can produce a hole having relatively rough sidewalls, thereby reducing the quality and cleanliness of the resulting hole. In many instances, clean holes of a relatively high quality are more desirable than holes having rough and splintered sidewalls. For example, wiring can be pulled more readily through clean holes having smooth sidewalls since holes having rough and splintered sidewalls increase the frictional resistance on the wire being pulled therethrough and, in some instances, can cut or otherwise damage the insulation surrounding the wire being pulled through the holes.

The quality of the hole produced by a spade bit, including the cleanliness of both the entry and exit points and the relative smoothness of the sidewalls of the resulting hole, is one of several parameters by which the performance of a spade bit is typically measured. In addition to the quality of the resulting hole, a spade bit is measured by the speed at which it cuts a hole of a predetermined diameter as well as the power or torque required to cut the hole of the predetermined diameter. Finally, the longevity or life of the spade bit itself, typically measured by hours of use or service, is a parameter. Therefore, it is desirable to develop long-lasting spade bits which rapidly drill high-quality holes while requiring a minimum amount of power or torque.

SUMMARY OF THE INVENTION

In view of the foregoing background, it is therefore an object of the present invention to provide an improved spade-type boring bit.

It is another and more specific object of the present invention to provide an improved spade-type boring bit having a shape which reduces the splintering of the workpiece in which a hole is drilled and which thereby increases the quality and cleanliness of the resulting hole.

It is a further and more particular object of the present invention to provide an improved spade-type boring bit having a shape which results in the reduction in the power consumption of the drill by avoiding the accumulation of chip swarf between the cutting edges of the spur and the side segments, and by avoiding the radially outward movement of the chip swarf toward the peripheral wall of the hole being formed.

These and other objects are provided, according to the present invention, by a spade-type boring bit having an elongate shank defining a central longitudinal axis, and a blade portion joined to one end of the shank and including a pair of generally flat side segments, such as wings, extending laterally in opposite directions from the central longitudinal axis. According to one preferred embodiment, the side segments include respective forward cutting edges and respective chamfered corner portions. The chamfered corner portion of each side segment preferably includes a chamfered edge extending both axially rearward and laterally outward from the respective forward cutting edge so as to more precisely cut or form the peripheral wall of the resulting hole. By extending both axially rearward and laterally outward from the respective forward cutting edge, the chamfered corner portions can repeatedly cut the peripheral wall of the resulting hole as the spade-type boring bit of the present invention is rotatably advanced through the workpiece. Therefore, the spade bit of the present invention efficiently produces high-quality holes having smooth peripheral walls and clean entry and exit points.

More specifically, the forward cutting edge of each side segment extends laterally outward from an inner portion to an outer portion. Accordingly, the chamfered edge of the chamfered corner portion of each side segment preferably extends both axially rearward and laterally outward from the outer portion of the respective forward cutting edge. In addition, a chamfer angle is typically defined between the chamfered edge of each respective side segment and a line parallel to the central longitudinal axis. According to one preferred embodiment, the chamfer angle is between about 30° and about 60°.

Each chamfered corner portion also includes a chamfer surface extending between the respective chamfered edge and a rear edge and defining a chamfer plane. In order to prevent binding of the spade-type boring bit, the chamfer surface preferably slopes radially inward from the respective chamfered edge to the rear edge. Accordingly, the chamfer plane advantageously intersects a plane perpendicular to the lateral plane defined by the respective side segment to thereby define a chamfer clearance angle, such as between about 10° and about 20° in one exemplary embodiment.

According to one embodiment of the present invention, the forward cutting edges of the respective side segments are aligned with each other along a centerline which passes through the central longitudinal axis. This alignment of the forward cutting edges along a centerline which passes through the central longitudinal axis results in the chip swarf being directed perpendicularly away from the cutting edges, with no radially outward component of movement. Thus, the chip swarf is not forced radially into the peripheral wall of the hole being formed, and the resulting binding is significantly alleviated. Therefore, the long-lasting spade bit of this embodiment of the present invention can efficiently produce high-quality holes as described above.

The blade portion of one advantageous embodiment can also include a generally flat central segment disposed along the central longitudinal axis which defines a central plane. The central segment of this embodiment includes opposite sides which are parallel to the central axis and which are joined to respective side segments. Further, the opposed side segments preferably define respective lateral planes which are parallel to each other and to the central longitudinal axis, but which are oblique to the central plane of the central segment, thereby producing a blade portion having a distinct Z-shaped cross-section.

The blade portion of the spade bit of the present invention also preferably includes a spur joined to and extending axially from the forward end of the blade portion. In one embodiment, the spur is threaded such that the spade bit is self-feeding. In other embodiments, the spur is preferably of a triangular shape extending to a spur point on the central longitudinal axis. The spur of these embodiments includes a pair of spur cutting edges extending along opposite sides of the spur between the spur point and the forward end of the blade portion. Each spur cutting edge advantageously extends radially outward of at least an innermost portion of the forward cutting edge of the adjacent side segment. In addition, each spur cutting edge is advantageously angularly offset from the forward cutting edge of the adjacent side segment in the predetermined direction of rotation of the spade-type boring bit when viewed along the central longitudinal axis. Thus, each spur cutting edge is both radially and angularly separated from the forward cutting edge of the adjacent side segment.

Further, at least a portion of each spur cutting edge extends axially rearward of the forward cutting edge of the adjacent side segment. Accordingly, each spur cutting edge can also be axially separated from the forward cutting edge of the adjacent side segment. By providing such radial, angular and, in some instances, axial separation between each spur cutting edge and the forward cutting edge of the adjacent side segment, accumulation of chip swarf between the spur cutting edge and the forward cutting edge of the adjacent side segment is significantly reduced, if not eliminated, since no corner is formed therebetween.

According to one embodiment, each side segment includes a cutting blade insert, preferably comprised of a relatively hard material, such as carbide, mounted along the forward end of the respective side segment to thereby define the respective forward edge and, in preferred embodiments, the respective chamfered edge. In addition, the forward portion of each side segment defines a cutting plane which preferably intersects the lateral plane defined by the respective side segment so that the forward cutting edge of each side segment is disposed angularly in advance of the respective lateral plane in the predetermined direction of rotation of the spade bit. More specifically, the cutting plane and the lateral plane of each respective side segment define a hook angle therebetween of between about 10° and about 20°.

According to another embodiment of the present invention, the spade bit is comprised of multiple discrete parts. In this embodiment, the blade portion preferably defines an internal cavity opening at the rear end to which a forwardly extending member of the shank is joined. The spade bit preferably includes means for interlocking the forwardly extending member of the shank within the internal cavity of the blade portion, such as by complimentary threaded portions defined within the internal cavity of the blade portion and along the forwardly extending member of the shank.

Each side segment can also include a forward end having a forward end surface sloping rearwardly from the respective forward cutting edge to a rear edge. According to one embodiment, each forward end surface includes first and second forward end planes which intersect a plane perpendicular to the central longitudinal axis to thereby define first and second lip clearance angles, respectively. Preferably, the second lip clearance angle is greater than the first lip clearance angle such that the forward end surface continues to slope rearwardly from the forward cutting edge to the rear edge. Each side segment can also include a first side along which the side segment is joined to the central segment and an opposed second side defining a second side surface. The second side surface is preferably arcuate or curvilinear in transverse cross-section and tapers inwardly when viewed from the forward end of the spade-type boring bit to define a side surface taper angle of about one-half of 1° to reduce binding of the spade bit during drilling operations.

Therefore, the spade-type boring bit of the present invention can efficiently produce a high-quality hole. In particular, the chamfered corner portions of the spade-type boring bit can repeatedly cut or form the peripheral wall of the resulting hole as the spade-type boring bit is rotatably advanced through the workpiece such that the peripheral wall is smooth and the entry and exit points are clean. In addition, the shape of the spade-type boring bit of the present invention can effectively control the accumulation and migration of chip swarf to reduce binding and power consumption during hole formation, thereby improving the efficiency with which a hole can be formed with the spade-type boring bit of the present invention.

BRIEF DESCRIPTION OF THE DRAWINGS

FIG. 3 is a front elevation view of the spade-type boring bit of the present invention illustrating the chamfered corner portions.

FIG. 4 is a side elevation view of a spade-type boring bit of the present invention.

FIG. 5 is an end view of the spade-type boring bit of FIG. 3 when viewed along the line 5—5 of FIG. 3 which is along the central longitudinal axis, and which illustrates the alignment of the forward cutting edges of the side segments along a centerline passing through the central longitudinal axis.

FIG. 5A is a fragmentary side view of a portion of a side segment of the spade-type boring bit of FIG. 5 illustrating the hook angle, and taken along the line 5A—5A of FIG. 5.

FIG. 6 is a fragmentary cross-sectional view of a portion of the spur of the spade-type boring bit of FIG. 3 illustrating the spur cutting edge, and taken along the line 6—6 of FIG. 3.

FIG. 7 is a fragmentary perspective view of a side segment of a spade-type boring bit of the present invention illustrating the chamfered corner portion.

FIG. 7A is a fragmentary cross-sectional view of a portion of the side segment of the spade-type boring bit of the present invention illustrating the chamfer clearance angle defined by the chamfered corner portion, and taken along line 7A—7A of FIG. 7.

FIG. 8 is a greatly enlarged fragmentary front elevation view of the blade portion of a spade-type boring bit of the present invention illustrating the chamfer angle defined between the respective chamfered edges and a line parallel to the central longitudinal axis.

FIG. 9 is a cross-sectional end view of the blade portion of the spade-type boring bit of FIG. 8 during a drilling operation illustrating its distinct Z-shaped cross-section, and taken along the line 9—9 of FIG. 8.

FIG. 10, taken along the line 10—10 of FIG. 9, is a lateral cross-sectional view of a portion of a side segment of the spade-type boring bit during drilling operations to illustrate the resulting chip removal.

FIG. 11 is a front elevation view of one embodiment of a spade-type boring bit of the present invention which has chamfered corner portions and in which the elongate shaft and the blade portion are threadably interlocked.

FIG. 12 is a lateral cross-sectional view of the embodiment of the spade-type boring bit of FIG. 11 illustrating the threaded connection of the elongate shaft to the blade portion, and taken along the line 12—12 of FIG. 11.

FIG. 13 is a cross-sectional end view of the embodiment of the spade-type boring bit of FIG. 11, taken along the line 13—13 of FIG. 11, and illustrating the rotation of the blade portion.

FIG. 14 is a fragmentary lateral cross-sectional view of a portion of a side segment of the blade portion of the embodiment of the spade-type boring bit of FIG. 11 illustrating a cutting blade insert, and taken along the line 14—14 of FIG. 13.

DETAILED DESCRIPTION OF THE PREFERRED EMBODIMENTS

Figures 1, 2:
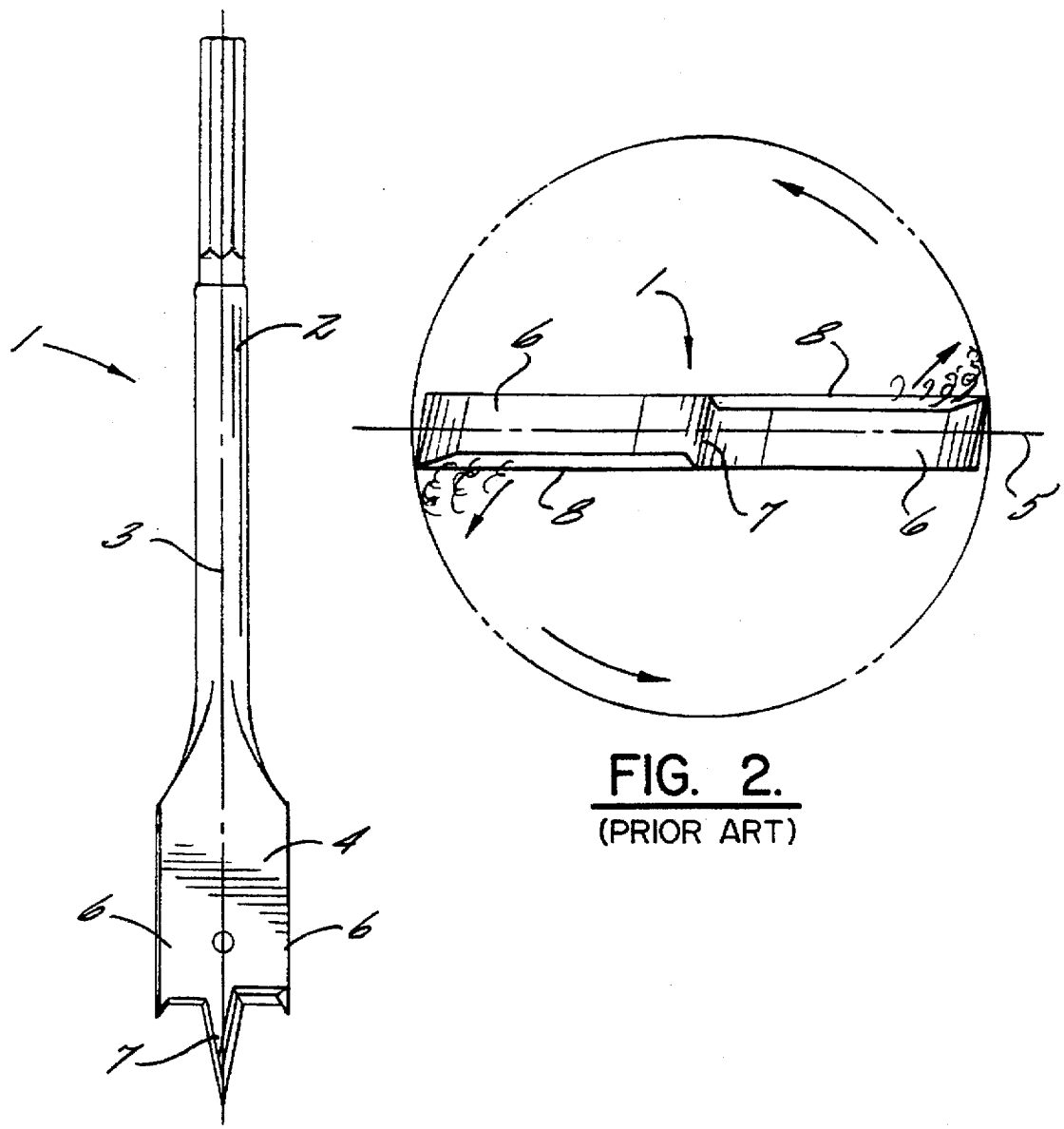
FIG. 1 is a front elevation view of a conventional spade-type boring bit.
FIG. 2 is an end view of a conventional spade-type boring bit of FIG. 1 during a drilling operation.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

As illustrated in FIGS. 3 and 4, a spade-type boring bit 10 of the present invention, hereinafter referred to as a "spade bit", includes an elongate shank 12 defining a central longitudinal axis 14 therethrough. The rear portion 16 of the shank is adapted to be received and held by a drill (not illustrated). For example, the elongate shank typically includes a cylindrical forward portion and a rear portion 16 that is hexagonal in transverse cross-section so as to be securely received and held by the chuck of a drill (not illustrated).

The spade bit 10 also includes a blade portion 18 joined to a forward end of the elongate shank 12, and which is integrally formed with the shank 12 in the illustrated embodiment. The blade portion includes a pair of generally flat side segments 20 which extend laterally in opposite directions from the central longitudinal axis 14. Each side segment 20 preferably includes a respective forward cutting edge 34. Each forward cutting edge is defined along the leading edge of the forward end of the respective side segment to initially contact and remove material as the spade bit 10 rotates in a predetermined direction of rotation during drilling operations. As illustrated by the arrows in FIG. 5, the spade bit is adapted to rotate counterclockwise when viewed along the central longitudinal axis 14 from the forward end toward the rear end.

According to the present invention, each side segment 20 also includes a respective chamfered corner portion 35. As shown in FIGS. 3 and 8, each chamfered corner portion includes a chamfered edge which extends both axially rearward and laterally outward from the respective forward cutting edge 34. In particular, the forward cutting edge of each side segment typically extends laterally outward from an inner portion to an outer portion. Accordingly, the chamfered edge of each chamfered corner portion preferably extends both axially rearward and laterally outward from the outer portion of the respective forward cutting edge.

By extending both axially rearward and laterally outward from the respective forward cutting edge 34, the chamfered corner portions 35 can repeatedly cut the peripheral wall of the resulting hole as the spade bit 10 of the present invention is rotatably advanced through the workpiece. Therefore, the spade bit of the present invention can efficiently produce high-quality holes having smooth peripheral walls and relatively clean entry and exit points.

As best shown in FIGS. 3 and 8, a chamfer angle 37 is defined between the chamfered edge of each respective chamfered corner portion 35 and a line parallel to the central longitudinal axis 14. The chamfer angle is typically between about 30° and about 60° and, according to one advantageous embodiment, is about 45°. As shown in FIG. 8, each chamfered corner portion also has a predetermined width 39 measured along a line colinear with the respective forward cutting edge 34 and which extends between the respective chamfered edge and a line parallel to the central longitudinal axis.

The predetermined width of the chamfered corner portions 35 typically varies directly with the size of spade bit 10 such that larger spade bits have chamfered corner portions with larger widths and smaller spade bits have chamfered corner portions with smaller widths. For example, for a spade bit having a diameter of between 1.5 inches and 0.875 inches, the chamfered corner portions can have a width of about 0.090 inches. In addition, for a spade bit having a diameter of between 0.8125 inches and 0.75 inches, the chamfered corner portions can have a width of about 0.070 inches. Likewise, for a spade bit having a diameter of between 0.6875 inches and 0.625 inches, the chamfered corner portions can have a width of about 0.060 inches. Still further, a spade bit having a diameter of between 0.5625 inches and 0.5 inches can have chamfered corner portions with a width of about 0.050 inches, while a spade bit with a diameter of between about 0.4375 inches and 0.375 inches can have chamfered corner portions with a width of about 0.025 inches. However, the chamfered corner portions of spade bits of the present invention can have any number of widths without departing from the spirit and scope of the present invention.

As shown in FIG. 5, the side segments 20 also preferably define respective lateral planes 22 which are parallel to each other and the central longitudinal axis 14. According to one advantageous embodiment, the blade portion 18 also includes a generally flat central segment 24 disposed along the central longitudinal axis and defining a central plane 26. More particularly, the central segment includes opposite sides 28 which are parallel to the central longitudinal axis, a rear end which is joined to the forward end of the shank 12 and an opposite forward end. According to this embodiment, the pair of side segments are joined to the central segment along respective sides of the central segment. In particular, the pair of side segments are joined to respective sides of the central segment such that lateral planes 22 defined by the respective side segments 20 intersect the central plane 26 defined by the central segment 24 at an oblique angle 29.

The spade bit 10 of the present invention and, more particularly, the blade portion 18 also includes a spur 30 joined to and extending axially from the forward end of the blade portion to center and to guide the spade bit 10 during drilling operations. As best illustrated in FIGS. 3 and 8, the spur can have a generally triangular shape so as to extend to a spur point on the central longitudinal axis 14. The spur of this embodiment also includes a pair of spur cutting edges 32, shown in cross-section in FIG. 7, extending along opposite sides of the spur between the spur point and a base of the spur at the forward end of the blade portion. The spur cutting edges are positioned to initially contact the workpiece during rotation of the spade bit in the predetermined direction of rotation as indicated by the counterclockwise arrows in FIG. 5.

According to one embodiment, the respective forward cutting edges 34 of the side segments 20 are preferably aligned with each other along a centerline 36 that passes through the central longitudinal axis 14 of the elongate shaft 12 as shown in FIG. 5. By being aligned along the centerline that passes through the central longitudinal axis of the elongate shaft, the forward cutting edges remove material during drilling operations more efficiently than conventional spade bits in which the forward cutting edges of the respective side segments are not aligned with each other, but are instead positioned in advance of a centerline that passes through the central longitudinal axis 14. See, for example, FIG. 2.

More specifically, the power or torque supplied to the spade bit 10 of this embodiment of the present invention during drilling operations is more efficiently transferred, via the aligned forward cutting edges 34, to the workpiece. For a given size of spade bit, the power supplied to the spade bit of this embodiment of the present invention is more efficiently transferred to the workpiece since the moment arm of the spade bit of the present invention is shorter than the moment arm of a conventional spade bit, such as that illustrated in FIGS. 1 and 2, due, at least in part, to the distinct Z-shaped cross-section of the spade bit of the present invention. In addition, the power supplied to the spade bit of this embodiment of the present invention is also more efficiently transferred to the workpiece since the total length of the spur cutting edges 32 and the forward cutting edges of the spade bit of the present invention of a given diameter is less than the total length of the spur cutting edges and the forward cutting edges of a conventional spade bit of the same diameter. Due to the more efficient power transfer, the spade bit of this embodiment of the present invention rotates more rapidly to produce clean holes of a relatively high quality.

The alignment of the forward cutting edges of the side segments 20 along a centerline 36 that passes through the central longitudinal axis 14 further improves the performance of the spade bit of this embodiment by directing the removed chip swarf perpendicularly from the cutting edge and upwardly, and not radially outwardly, as illustrated in FIGS. 9 and 10. By urging the chip swarf in the indicated direction, and not radially outward as urged by conventional spade bits, the chip swarf does not hinder subsequent rotation of the spade bit by binding between the spade bit and the sidewalls of the hole formed thereby. Accordingly, the longevity of the spade bit of this embodiment is increased by reducing the wear on the spade bit and the efficiency with which the spade bit drills a hole of a predetermined diameter is enhanced.

As best illustrated in FIGS. 8 and 9, each spur cutting edge 32 of one advantageous embodiment of the spade bit 10 of the present invention preferably extends radially outward of at least an innermost portion of the forward cutting edge 34 of the adjacent side segment 20. Thus, each spur cutting edge of this embodiment is radially separated from the forward cutting edge of the adjacent side segment. In addition, the spur 30 of this embodiment preferably defines a spur plane which is oblique to the respective lateral planes defined by said side segments such that each spur cutting edge is also preferably angularly offset from the forward cutting edge of the adjacent side segment in the predetermined direction of rotation of the spade bit 10 when viewed along the central longitudinal axis 14. In particular, each spur cutting edge of this embodiment is positioned angularly rearward of the forward cutting edge of the adjacent side segment in the predetermined direction of rotation. Thus, each spur cutting edge can also be angularly separated from the forward cutting edge of the adjacent side segment. Further, at least a portion of each spur cutting edge 32 can extend axially rearward of the forward cutting edge 34 of the adjacent side segment in the longitudinal direction so that each spur cutting edge can also be axially separated from the forward cutting edge of the adjacent side segment.

Due to the separation of each spur cutting edge 32 from the forward cutting edge 34 of the adjacent side segment 20, the spade-type boring bit 10 of this embodiment of the present invention more efficiently removes material during drilling operations. In particular, material is removed by either a spur cutting edge or a forward cutting edge of a side segment and is directed generally rearward from the cutting surface by the respective cutting edge. Due to the separation of the spur cutting edge from the forward cutting edge of the adjacent side segment, little, if any, chip swarf is accumulated therebetween as described above in conjunction with conventional spade bits. Instead, the chip swarf is directed generally rearward from the cutting surface so that the spade bit of this embodiment can continue to cut into the workpiece with both the spur cutting edge and the adjacent forward cutting edge, thereby further improving the efficiency of the drilling operation.

As illustrated in FIG. 6, a forward portion of each side segment preferably defines a cutting plane 38. The cutting plane intersects the lateral plane 22 defined by the respective side segment 20 to define a hook angle 40 therebetween. In one advantageous embodiment, the hook angle is between about 10° and about 20° and, more preferably, is about 15°. The forward cutting edges 34 of the illustrated embodiment are disposed angularly in advance of the lateral planes of the respective side segments in the predetermined direction of rotation of the spade bit 10 when viewed along the central longitudinal axis 14. As shown in FIGS. 9 and 10, chips removed from the workpiece by the forward cutting edge are thereby directed upwardly or rearwardly along the spade bit and away from the cutting surface by further rotation of the spade bit, and, in part, by the hook angle defined between the cutting plane and the lateral plane.

Further, each side segment 20 of the spade bit 10 can also include a forward end having a forward end surface 42 extending between the respective forward cutting edge 34 and a rear edge 44. Advantageously, the forward end surface slopes rearwardly from the forward cutting edge to the rear edge such that only the forward cutting edge contacts the cutting surface during drilling operations. Thus, the drag or other frictional forces generated between the rotating spade bit and the workpiece are reduced and the efficiency with which the spade bit of the present invention drills is further improved.

In the embodiment illustrated in FIG. 6, each forward end surface includes first and second forward end planes 46a and 46b, respectively, which intersect a plane 48 perpendicular to the central longitudinal axis 14 to define first and second lip clearance angles 50a and 50b, respectively, therebetween. As shown, the second lip clearance angle is typically larger than the first lip clearance angle in order to further reduce drag or other frictional forces generated between the rotating spade bit and the workpiece. For example, in one embodiment, the first and second lip clearance angles are about 5° and 8°, respectively. However, the first and second lip clearance angles can be varied without departing from the spirit and scope of the present invention. In addition, the forward end surface need not include both first and second forward end planes as illustrated, but can, instead, include a single forward end plane without departing from the spirit and scope of the present invention.

As illustrated in FIGS. 7 and 7a, the chamfered corner portion 35 of each side segment 20 includes a chamfer surface extending between the respective chamfered edge and a rear edge. Each chamfer surface defines a chamfer plane which intersects a plane perpendicular to the lateral plane 22 defined by the respective side segment to thereby define a chamfer clearance angle 41. Advantageously, the chamfer surface slopes radially inward from the chamfered edge to the rear edge to define a chamfer clearance angle of between about 10° and about 20° and, in one preferred embodiment, of about 12°

Still further, each side segment 20 of the illustrated embodiment of the spade bit 10 of the present invention includes a first side joined to the central segment 24 along a side 28 thereof, and an opposed second side 52 defining a second or outer side surface. The second or outer side surface extends between respective forward and rear edges and, as shown in FIG. 5, preferably follows the arc of a circle in lateral cross-section to further reduce the drag or other frictional forces generated by the rotation of the spade bit within the hole. Alternatively, the side surface can taper radially inwardly from the forward edge to the rear edge such that only the forward edge of the side surface of the side segment contacts the sidewalls of the hole to thereby further reduce binding of the spade bit.

The second sides 52 of the respective side segments 20 also preferably taper inwardly in an axial direction from the forward end to the rear end of the blade portion 18. Thus, as shown in FIG. 3, a side surface taper angle 53, typically, about one-half of 1°, or ½°, is defined between the side surface plane and a line parallel to the central longitudinal axis 14. By tapering the second sides of the side segments inwardly, the side surfaces preferably only contact the workpiece near the cutting surface such that drag or other frictional forces are still further reduced.

The spade bit 10 of the present invention can be integrally fabricated from a single piece of metal as illustrated in FIGS.

3 and 4. Alternatively, the spade bit of the present invention can be formed from the combination of several components without departing from the spirit and scope of the present invention. For example, as illustrated in FIGS. 11 and 12, the elongate shank 12 and the blade portion 18 can be separately formed and subsequently joined to form the spade bit of the present invention.

In particular, the blade portion 18 can include an internal cavity 54 which opens at a rear end to which the elongate shaft 12 is joined. Correspondingly, the elongate shaft 12 can include a forwardly extending member 56 adapted to be received within the internal cavity defined by the blade portion.

The spade bit 10 of this embodiment also includes means for interlocking the forwardly extending member of the shank within the internal cavity of the blade portion. For example, the interlocking means can include complimentarily threaded portions defined within the internal cavity of the blade portion and along the forwardly extending member of the shank such that the shank and the blade portion can be threadably connected. As known to those skilled in the art, the threaded connection is preferably self-tightening such that rotation of the spade bit in the predetermined direction of rotation further tightens the threaded connection between the shank and the blade portion. The spade bit can also include other interlocking means without departing from the spirit and scope of the invention. For example, the blade portion and the shank can be press-fit or joined, such as by brazing, to form a secure interconnection therebetween. In addition, the shank can include the internal cavity and the blade portion can include a corresponding rearwardly extending member for interlocking the pieces without departing from the spirit and scope of the present invention.

As illustrated in FIGS. 13 and 14, the side segments 20 of one embodiment of the spade bit 10 of the present invention can include respective cutting blade inserts 58. Each cutting blade insert is typically comprised of a relatively hard material, such as carbide, and is mounted along the forward end of a respective side segment to define the respective forward cutting edge 34 and, in some embodiments, the respective chamfered edge 35. In addition, the forward cutting edges defined by the respective cutting blade inserts of this embodiment can also be aligned along the centerline 36 that passes through the central longitudinal axis 14 of the elongate shank 12 as described above.

Although a spade bit 10 of the present invention can be comprised of multiple pieces and can also include cutting blade inserts 58 as illustrated in FIGS. 11–14, a spade bit of the present invention can be comprised of multiple pieces without including cutting blade inserts. Likewise, a spade bit of the present invention can be fabricated as an integral unit, but can still include cutting blade inserts 58. Alternatively, the forward cutting edges 34 and, in some embodiments, the chamfered edges 35 of a spade bit of the present invention can be formed by depositing a layer of a relatively hard material, such as diamond, on a substrate, namely, the leading edge of the forward end of each side segment 20. The relatively hard material is preferably stronger than the underlying side segments.

Figure 15:
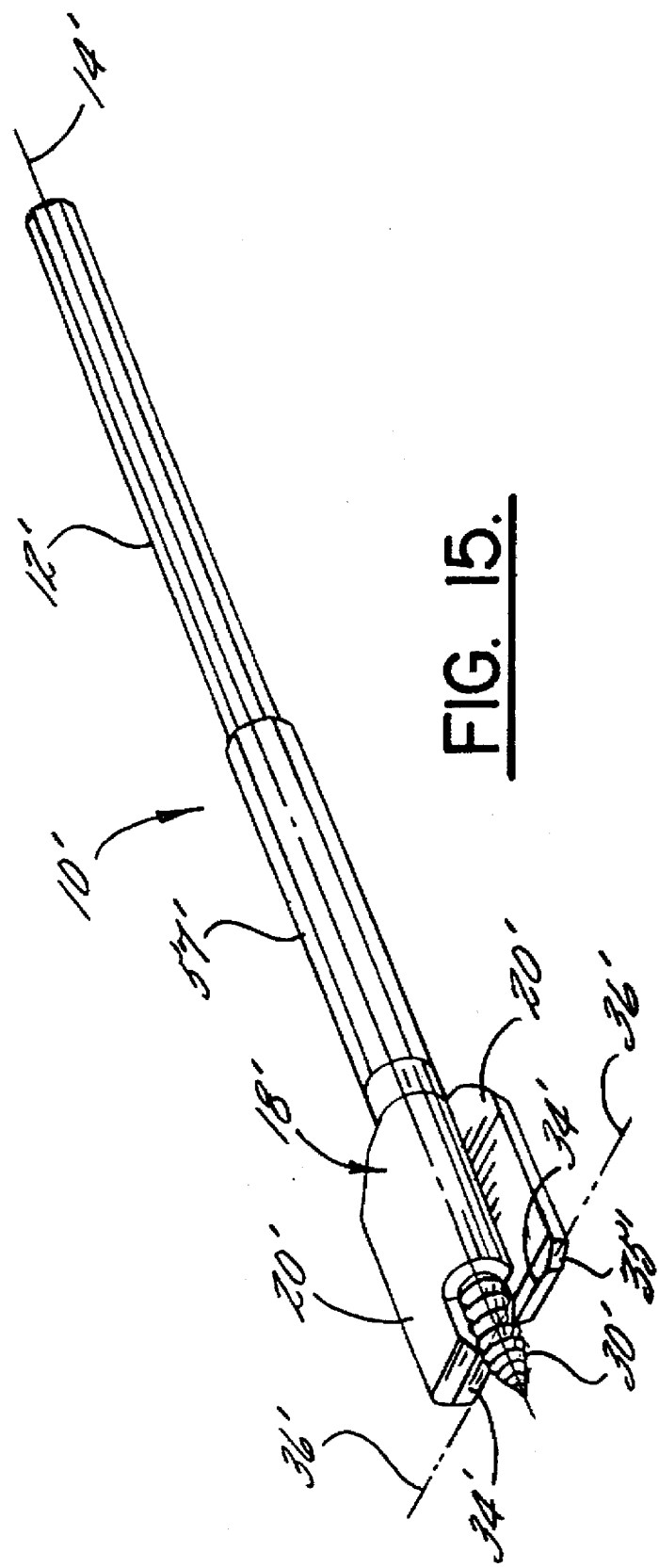
FIG. 15 is a perspective view of a self-feeding embodiment of the spade-type boring bit of the present invention which includes chamfered corner portions and a threaded spur.

As illustrated in FIG. 15, the spade bit of the present invention can also be self-feeding to facilitate entry and advancement of the spade bit through a workpiece. According to this embodiment, the blade portion 18' of the spade bit 10' includes a threaded spur 30' joined to and extending axially from the forward end of the blade portion. As illustrated, the blade portion of the self-feeding embodiment of the spade bit also includes a pair of generally flat side segments 20' that extend laterally in opposite directions from the central longitudinal axis 14' of the spade bit. The side segments include respective chamfered corner portions 35' and forward cutting edges 34' which, in the illustrated embodiment, are aligned with each other along a centerline 36' that passes through the central longitudinal axis. Thus, among the features which the self-feeding embodiment of the spade bit has in common with the other embodiments described above is the Z-shape cross-section of the blade portion, as best illustrated in FIGS. 5, 13 and 15, and the chamfered corner portions of the side segments, as best shown in FIGS. 3, 8 and 15. Accordingly, the self-feeding embodiment of the spade bit illustrated in FIG. 15 also provides the numerous improvements in drilling efficiency described in detail above.

The spade bit 10 of the present invention, and the individual pieces thereof, can be formed in a variety of manners as will be apparent to those skilled in the art. For example, the spade bit can be formed by a conventional hot forging process as known to those skilled in the art. Alternatively, the spade bit of the present invention can be formed by the forging process described in detail in copending U.S. patent application Ser. No. 08/366,986 entitled "A Spade-Type Boring Bit and an Associated Method and Apparatus for Forming Metallic Parts". As described therein, the forging method provides for the forging of a plurality of parts, such as a plurality of spade bits of the present invention, from a continuous wire stock. Typically, the metal stock is comprised of a steel alloy, however, the metal stock can be comprised of any forgeable material known to those skilled in the art. For example, the metal stock can be comprised of copper, aluminum, titanium, zinc, brass or alloys thereof.

In addition, while the spade bit 10 of the present invention could be forged so as to have a blade portion 18 which includes laterally opposed side segments 20 having respective chamfered corner portions 35, the side segments of the spade bit of the present invention are typically ground, such as by a conventional grinding process, following the forging process to form the respective chamfered corner portions. Accordingly, chamfered corner portions which define a predetermined chamfer angle 37 with respect to a line parallel to the central longitudinal axis 14 can be precisely ground into the respective side segments.

Regardless of the method by which the spade bit 10 of the present invention is made, the spade bit can efficiently produce a high-quality hole. More specifically, the chamfered corner portions 35 of the spade bit can repeatedly cut the peripheral sidewall of the resulting hole as the spade bit is rotatably advanced through the workpiece such that the peripheral sidewall is smooth and the entry and exit points are clean. In addition, other embodiments of the spade bit of the present invention effectively remove the chip swarf generated during drilling operations so as to reduce binding and power consumption during hole formation. Accordingly, the spade bit of the present invention can efficiently form a high quality hole.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:

1. A spade-type boring bit comprising:
   an elongate shank defining a central longitudinal axis; and a blade portion joined at a rear end to one end of said shank along the central longitudinal axis, said blade portion comprising:
  a pair of generally flat side segments which extend laterally in opposite directions from the central longitudinal axis, wherein said side segments include respective forward cutting edges and respective chamfered corner portions, wherein the chamfered corner portion of each side segment includes a chamfered edge extending both axially rearward and laterally outward from the respective forward cutting edge, and wherein each chamfered corner portion includes a chamfer surface which slopes radially inward from the respective chamfered edge to a rear edge; and
  a spur joined to and extending axially from a forward end of said blade portion opposite the rear end.

2. A spade-type boring bit according to claim 1 wherein a line parallel to the central longitudinal axis and the chamfered edge of each respective side segment defines a chamfer angle therebetween, the chamfer angle being between about 30° and about 60°.

3. A spade-type boring bit according to claim 1 wherein said pair of side segments define respective lateral planes, and wherein each chamfer surface defines a chamfer plane which intersects a plane perpendicular to the lateral plane defined by the respective side segment to thereby define a chamfer clearance angle.

4. A spade-type boring bit according to claim 3 wherein the chamfer clearance angle is between about 10° and about 20°.

5. A spade-type boring bit according to claim 1 wherein the forward cutting edge of each side segment extends laterally outward from an inner portion to an outer portion, and wherein the chamfered edge of the chamfered corner portion of each side segment extends both axially rearward and laterally outward from the outer portion of the respective forward cutting edge.

6. A spade-type boring bit according to claim 1 wherein each side segment includes a cutting blade insert mounted along a forward end of said respective side segment to thereby define both the respective forward cutting edge and the respective chamfered edge.

7. A spade-type boring bit according to claim 6 wherein each cutting blade insert is comprised of carbide.

8. A spade-type boring bit according to claim 1 wherein the forward end of each respective side segment includes a layer of a relatively hard material to thereby define both the respective forward cutting edge and the respective chamfered edge, and wherein the relatively hard material is stronger than the material comprising the respective side segments.

9. A spade-type boring bit according to claim 1 wherein said pair of side segments define respective lateral planes which are parallel to each other, and wherein a forward portion of each side segment defines a cutting plane which intersects the lateral plane defined by the respective side segment such that the forward cutting edge of each side segment is disposed angularly in advance of the respective lateral plane in a predetermined direction of rotation of the spade-type boring bit when viewed along the central longitudinal axis.

10. A spade-type boring bit according to claim 9 wherein the cutting plane and the lateral plane of each respective side segment define a hook angle therebetween, the hook angle being between about 10° and about 20°.

11. A spade-type boring bit according to claim 1 wherein said blade portion defines an internal cavity opening at the rear end thereof, and wherein said elongate shank includes a forwardly extending member adapted to be received within the internal cavity of said blade portion, the spade-type boring bit further comprising means for interlocking the forwardly extending member of said shank within the internal cavity of said blade portion.

12. A spade-type boring bit according to claim 11 wherein said interlocking means includes complimentary threaded portions defined within the internal cavity of said blade portion and along the forwardly extending member of said shank such that said shank and said blade portion can be threadably connected.

13. A spade-type boring bit according to claim 1 wherein each side segment includes a forward end having a forward end surface sloping rearwardly from the respective forward cutting edge to a rear edge, each forward end surface comprising first and second forward end planes which intersect a plane perpendicular to the central longitudinal axis to thereby define first and second lip clearance angles, respectively.

14. A spade-type boring bit according to claim 13 wherein the second lip clearance angle is greater than the first lip clearance angle.

15. A spade-type boring bit according to claim 1 wherein each side segment extends laterally outward from the central longitudinal axis from a first side to an opposed second side which defines an arcuate second side surface extending between respective forward and rear edges.

16. A spade-type boring bit according to claim 15 wherein said blade portion includes a forward end and an opposed rear end and wherein the second side tapers axially inward from the forward end to the rear end of said blade portion such that a side surface taper angle of about one-half of 1° is defined between the respective side surface and a line parallel to the central longitudinal axis.

17. A spade-type boring bit comprising:
  an elongate shank defining a central longitudinal axis; and
  a blade portion joined to one end of said shank, said blade portion comprising:
    a generally flat central segment disposed along the central longitudinal axis and defining a central plane, said central segment including opposite sides which are parallel to said central axis, a rear end which is joined to said one end of said shank, and an opposite forward end;
    a pair of generally flat side segments joined to said central segment along respective sides thereof, said side segments defining respective lateral planes which are parallel to each other and which intersect said central plane at an oblique angle, each side segment also including a respective forward cutting edge and a respective chamfered corner portion, wherein the chamfered corner portion of each side segment includes a chamfered edge extending both axially rearward and laterally outward from the respective forward cutting edge; and
    a spur joined to and extending axially from the forward end of said central segment.

18. A spade-type boring bit according to claim 17 wherein said respective forward cutting edges of said side segments are aligned with each other along a centerline which passes through the central longitudinal axis of said elongate shank.

19. A spade-type boring bit according to claim 17 wherein said spur is of a generally triangular shape extending in the central plane to a spur point on the central longitudinal axis, said spur including a pair of spur cutting edges extending along opposite sides of said spur between the spur point and the forward end of said central segment such that each spur cutting edge extends radially outward of at least an innermost portion of the forward cutting edge of the adjacent side segment, and wherein each spur cutting edge is angularly offset from the forward cutting edge of the adjacent side segment in a predetermined direction of rotation of the spade-type boring bit when viewed along the central longitudinal axis, such that each spur cutting edge is both radially and angularly separated from the forward cutting edge of the adjacent side segment.

20. A spade-type boring bit according to claim 19 wherein at least a portion of each spur cutting edge extends axially rearward of the forward cutting edge of the adjacent side segment such that each spur cutting edge is axially separated from the forward cutting edge of the adjacent side segment.

21. A spade-type boring bit according to claim 17 wherein a line parallel to the central longitudinal axis and the chamfered edge of each respective side segment defines a chamfer angle therebetween, the chamfer angle being between about 30° and about 60°.

22. A spade-type boring bit according to claim 17 wherein said pair of side segments define respective lateral planes, and wherein each chamfered corner portion includes a chamfer surface extending between the respective chamfered edge and a rear edge, each chamfer surface defining a chamfer plane which intersects a plane perpendicular to the lateral plane defined by the respective side segment to thereby define a chamfer clearance angle such that the chamfer surface slopes radially inwardly from the respective chamfered edge to the rear edge.

23. A spade-type boring bit according to claim 22 wherein the chamfer clearance angle is between about 10° and about 20°.

24. A spade-type boring bit according to claim 17 wherein the forward cutting edge of each side segment extends laterally outward from an inner portion adjacent said central segment to an outer portion, and wherein the chamfered edge of the chamfered corner portion of each side segment extends both axially rearward and laterally outward from the outer portion of the respective forward cutting edge.

25. A spade-type boring bit according to claim 17 wherein each side segment includes a cutting blade insert mounted along a forward end of said respective side segment to thereby define both the respective forward cutting edge and the respective chamfered edge.

26. A spade-type boring bit according to claim 25 wherein each cutting blade insert is comprised of carbide.

27. A spade-type boring bit according to claim 17 wherein the forward end of each respective side segment includes a layer of a relatively hard material to thereby define both the respective forward cutting edge and the respective chamfered edge, and wherein the relatively hard material is stronger than the material comprising the respective side segments.

28. A spade-type boring bit according to claim 17 wherein a forward portion of each side segment defines a cutting plane which intersects the lateral plane defined by the respective side segment such that the forward cutting edge of each side segment is disposed angularly in advance of the respective lateral plane in a predetermined direction of rotation of the spade-type boring bit when viewed along the central longitudinal axis.

29. A spade-type boring bit according to claim 28 wherein the cutting plane and the lateral plane of each respective side segment define a hook angle therebetween, the hook angle being between about 10° and about 20°.

30. A spade-type boring bit according to claim 17 wherein said blade portion defines an internal cavity opening at the rear end of said central segment to which said elongate shank is joined, and wherein said elongate shank includes a forwardly extending member adapted to be received within the internal cavity of said blade portion, the spade-type boring bit further comprising means for interlocking the forwardly extending member of said shank within the internal cavity of said blade portion.

31. A spade-type boring bit according to claim 30 wherein said interlocking means includes complimentary threaded portions defined within the internal cavity of said blade portion and along the forwardly extending member of said shank such that said shank and said blade portion can be threadably connected.

32. A spade-type boring bit according to claim 17 wherein each side segment includes a forward end having a forward end surface sloping rearwardly from the respective forward cutting edge to a rear edge, each forward end surface comprising first and second forward end planes which intersect a plane perpendicular to the central longitudinal axis to thereby define first and second lip clearance angles, respectively.

33. A spade-type boring bit according to claim 32 wherein the second lip clearance angle is greater than the first lip clearance angle.

34. A spade-type boring bit according to claim 17 wherein each side segment includes a first side along which said side segment is joined to said central segment and an opposed second side defining an arcuate second side surface extending between respective forward and rear edges.

35. A spade-type boring bit according to claim 34 wherein said blade portion includes a forward end and an opposed rear end and wherein the second side tapers axially inward from the forward end to the rear end of said blade portion such that a side surface taper angle of about one-half of 1° is defined between the respective side surface and a line parallel to the central longitudinal axis.

36. A spade-type boring bit comprising:
an elongate shank defining a central longitudinal axis; and
a blade portion joined at a rear end to one end of said shank along the central longitudinal axis, said blade portion including:
a pair of generally flat side segments which extend laterally in opposite directions from the central longitudinal axis, said side segments defining respective lateral planes which are parallel to each other and the central longitudinal axis, said side segments including respective forward cutting edges, at least one forward cutting edge lying along a centerline which passes through the central longitudinal axis, said side segments further including respective chamfered corner portions having chamfered edges extending both axially rearward and laterally outward from the respective forward cutting edge; and
a spur joined to and extending axially from a forward end of said blade portion opposite the rear end.

37. A spade-type boring bit according to claim 36 wherein said blade portion further includes a generally flat central segment including opposite sides along which respective sides of said side segments are joined, said central segment being disposed along the central longitudinal axis and defining a central plane which intersects the respective lateral planes at an oblique angle.

38. A spade-type boring bit according to claim 36 wherein said spur is threaded such that the spade-type boring bit is self-feeding.

39. A spade-type boring bit according to claim 36 wherein said spur is of a generally triangular shape and defines a spur plane which is oblique to and which intersects the respective lateral planes defined by said side segments, said spur also defining a spur base along which said spur is joined to the forward end of said blade portion, a spur point aligned with the central longitudinal axis, and a pair of spur cutting edges extending along opposite sides of said spur between the spur point and the spur base such that each spur cutting edge extends radially outward of at least an innermost portion of the forward cutting edge of the adjacent side segment, and wherein each spur cutting edge is angularly offset from the forward cutting edge of the adjacent side segment in a predetermined direction of rotation of the spade-type boring bit when viewed along the central longitudinal axis, such that each spur cutting edge is both radially and angularly separated from the forward cutting edge of the adjacent side segment.

40. A spade-type boring bit according to claim 39 wherein at least a portion of each spur cutting edge extends longitudinally rearward of the forward cutting edge of the adjacent side segment such that each spur cutting edge is longitudinally separated from the forward cutting edge of the adjacent side segment.

41. A spade-type boring bit according to claim 36 wherein a line parallel to the central longitudinal axis and the chamfered edge of each respective side segment defines a chamfer angle therebetween, the chamfer angle being between about 30° and about 60°.

42. A spade-type boring bit according to claim 36 wherein said pair of side segments define respective lateral planes, and wherein each chamfered corner portion includes a chamfer surface extending between the respective chamfered edge and a rear edge, each chamfer surface defining a chamfer plane which intersects a plane perpendicular to the lateral plane defined by the respective side segment to thereby define a chamfer clearance angle such that the chamfer surface slopes radially inwardly from the respective chamfered edge to the rear edge.

43. A spade-type boring bit according to claim 42 wherein the chamfer clearance angle is between about 10° and about 20°.

44. A spade-type boring bit according to claim 36 wherein the forward cutting edge of each side segment extends laterally outward from an inner portion to an outer portion, and wherein the chamfered edge of the chamfered corner portion of each side segments extends both axially rearward and laterally outward from the outer portion of the respective forward cutting edge.

45. A spade-type boring bit according to claim 36 wherein each side segment includes a carbide cutting blade insert mounted along a forward end of said respective side segment to thereby define both the respective forward cutting edge and the respective chamfered edge.

46. A spade-type boring bit according to claim 36 wherein each respective side segment includes a layer of a relatively hard material to thereby define both the respective forward cutting edge and the respective chamfered edge wherein the relatively hard material is stronger than the material comprising the respective side segments.

47. A spade-type boring bit according to claim 36 wherein a forward portion of each side segment defines a cutting plane which intersects the lateral plane defined by the respective side segment such that the forward cutting edge of each side segment is disposed angularly in advance of the respective lateral plane in a predetermined direction of rotation of the spade-type boring bit when viewed along the central longitudinal axis to thereby define a hook angle of between about 10° and about 20° between the cutting plane and the lateral plane of each respective side segment.

48. A spade-type boring bit according to claim 36 wherein said blade portion defines an internal cavity opening at the rear end of said blade portion to which said shank is joined, and wherein said shank includes a forwardly extending member adapted to be received within the internal cavity of said blade portion, the spade-type boring bit further comprising means for interlocking the forwardly extending member of said shank within the internal cavity of said blade portion.

49. A spade-type boring bit according to claim 48 wherein said interlocking means includes complimentary threaded portions defined within the internal cavity of said blade portion and along the forwardly extending member of said shank such that said shank said blade portion can be threadably connected.

50. A spade-type boring bit according to claim 36 wherein each side segment includes a forward end having a forward end surface sloping rearwardly from the respective forward cutting edge to a rear edge, each forward end surface comprising first and second forward end planes which intersect a plane perpendicular to the central longitudinal axis to thereby define first and second lip clearance angles, respectively.

51. A spade-type boring bit according to claim 50 wherein the second lip clearance angle is greater than the first lip clearance angle.

52. A spade-type boring bit according to claim 36 wherein each side segment includes a first side along which said side segment is joined to said central segment and an opposed second side defining an arcuate second side surface extending between respective forward and rear edges.

53. A spade-type boring bit according to claim 52 wherein said blade portion includes a forward end and an opposed rear end and wherein the second side tapers axially inward from the forward end to the rear end of said blade portion such that a side surface taper angle of about one-half of 1° is defined between the respective side surface and a line parallel to the central longitudinal axis.

54. A spade-type boring bit comprising:
  an elongate shank defining a central longitudinal axis:
  a blade portion joined at a rear end to one end of said shank along the central longitudinal axis, said blade portion including:
    a pair of generally flat side segments which extend laterally in opposite directions from the central longitudinal axis, said side segments including respective forward cutting edges and respective chamfered corner portions, wherein the chamfered corner portion of each side segment includes a chamfered edge extending both axially rearward and laterally outward from the respective forward cutting edge; and
    a generally triangular spur joined to and extending axially from a forward end of said blade portion opposite the rear end, said spur defining a spur base along which said spur is joined to the forward end of said blade portion, a spur point aligned with the central longitudinal axis, and a pair of spur cutting edges extending along opposite sides of said spur between the spur point and the spur base such that each spur cutting edge extends radially outward of at least an innermost portion of the forward cutting edge of the adjacent side segment,
  and wherein each spur cutting edge is angularly offset from the forward cutting edge of the adjacent side segment in a predetermined direction of rotation of the spade-type boring bit when viewed along the central longitudinal axis, such that each spur cutting edge is both radially and angularly separated from the forward cutting edge of the adjacent side segment.

55. A spade-type boring bit according to claim 54 wherein at least a portion of each spur cutting edge extends longitudinally rearward of the forward cutting edge of the adjacent side segment such that each spur cutting edge is longitudinally separated from the forward cutting edge of the adjacent side segment.

56. A spade-type boring bit according to claim 54 wherein said side segments define respective lateral planes and said spur defines a spur plane which is oblique to the respective lateral planes defined by said side segments.

57. A spade-type boring bit according to claim 56 wherein the lateral planes defined by said side segments are parallel to each other and the central longitudinal axis, and wherein the respective forward cutting edges are aligned with each other along a centerline which passes through the central longitudinal axis.

58. A spade-type boring bit according to claim 56 wherein a forward portion of each side segment defines a cutting plane which intersects the lateral plane defined by the respective side segment such that the forward cutting edge of each side segment is disposed angularly in advance of the respective lateral plane in a predetermined direction of rotation of the spade-type boring bit when viewed along the central longitudinal axis to thereby define a hook angle of between about 10° and about 20° between the cutting plane and the lateral plane of each respective side segment.

59. A spade-type boring bit according to claim 54 wherein a line parallel to the central longitudinal axis and the chamfered edge of each respective side segment defines a chamfer angle therebetween, the chamfer angle being between about 30° and about 60°.

60. A spade-type boring bit according to claim 54 wherein said pair of side segments define respective lateral planes, and wherein each chamfered corner portion includes a chamfer surface extending between the respective chamfered edge and a rear edge, each chamfer surface defining a chamfer plane which intersects a plane perpendicular to the lateral plane defined by the respective side segment to thereby define a chamfer clearance angle such that the chamfer surface slopes radially inwardly from the respective chamfered edge to the rear edge.

61. A spade-type boring bit according to claim 60 wherein the chamfer clearance angle is between about 10° and about 20°.

62. A spade-type boring bit according to claim 54 wherein the forward cutting edge of each side segment extends laterally outward from an inner portion to an outer portion, and wherein the chamfered edge of the chamfered corner portion of each side segments extends both axially rearward and laterally outward from the outer portion of the respective forward cutting edge.

63. A spade-type boring bit according to claim 54 wherein said blade portion defines an internal cavity opening at the rear end of said blade portion to which said shank is joined, and wherein said shank includes a forwardly extending member adapted to be received within the internal cavity of said blade portion, the spade-type boring bit further comprising means for interlocking the forwardly extending member of said shank within the internal cavity of said blade portion.

64. A spade-type boring bit according to claim 63 wherein said interlocking means includes complimentary threaded portions defined within the internal cavity of said blade portion and along the forwardly extending member of said shank such that said shank said blade portion can be threadably connected.

65. A spade-type boring bit according to claim 54 wherein each side segment includes a carbide cutting blade insert mounted along a forward end of said respective side segment to thereby define both the respective forward cutting edge and the respective chamfered edge.

66. A spade-type boring bit according to claim 54 wherein each respective side segment includes a layer of a relatively hard material to thereby define both the respective forward cutting edge and the respective chamfered edge wherein the relatively hard material is stronger than the material comprising the respective side segments.

67. A spade-type boring bit according to claim 54 wherein each side segment includes a forward end having a forward end surface sloping rearwardly from the respective forward cutting edge to a rear edge, each forward end surface comprising first and second forward end planes which intersect a plane perpendicular to the central longitudinal axis to thereby define first and second lip clearance angles, respectively.

68. A spade-type boring bit according to claim 67 wherein the second lip clearance angle is greater than the first lip clearance angle.

69. A spade-type boring bit according to claim 54 wherein each side segment includes a first side along which said side segment is joined to said central segment and an opposed second side defining an arcuate second side surface extending between respective forward and rear edges.

70. A spade-type boring bit according to claim 69 wherein said blade portion includes a forward end and an opposed rear end and wherein the second side tapers axially inward from the forward end to the rear end of said blade portion such that a side surface taper angle of about one-half of 1° is defined between the respective side surface and a line parallel to the central longitudinal axis.

71. A spade-type boring bit according to claim 17 wherein at least one forward cutting edge lies along a centerline which passes through the central longitudinal axis of said elongate shank.

72. A spade-type boring bit according to claim 36 wherein said respective forward cutting edges of both said side segments are aligned with each other along the centerline which passes through the central longitudinal axis of said elongate shank.

73. A spade-type boring bit according to claim 54 wherein at least one forward cutting edge lies along a centerline which passes through the central longitudinal axis of said elongate shank.

\* \* \* \* \*